(12) United States Patent
Pattar

(10) Patent No.: US 11,822,567 B2
(45) Date of Patent: Nov. 21, 2023

(54) SYSTEM AND METHOD FOR AUTO-MAPPING SOURCE AND TARGET DATA ATTRIBUTES BASED ON METADATA INFORMATION

(71) Applicant: Tata Consultancy Services Limited, Mumbai (IN)

(72) Inventor: Sridhar Gopal Pattar, Pune (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 309 days.

(21) Appl. No.: 17/328,967

(22) Filed: May 24, 2021

(65) Prior Publication Data

US 2022/0114190 A1    Apr. 14, 2022

(30) Foreign Application Priority Data

Oct. 13, 2020    (IN) .............................. 202021044626

(51) Int. Cl.
| G06F 17/00 | (2019.01) |
| G06F 16/25 | (2019.01) |
| G06F 16/22 | (2019.01) |

(52) U.S. Cl.
CPC ........ G06F 16/254 (2019.01); G06F 16/2282 (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 6,839,714 | B2 | 1/2005 | Wheeler et al. |
| 10,452,661 | B2* | 10/2019 | Bernstein .......... G06F 16/24573 |
| 2016/0371275 | A1* | 12/2016 | Bernstein .............. G06F 40/169 |
| 2017/0024657 | A1 | 1/2017 | Sahu et al. |
| 2018/0053096 | A1 | 2/2018 | Farrell et al. |
| 2021/0200744 | A1* | 7/2021 | Gubba ................ G06F 16/2282 |

FOREIGN PATENT DOCUMENTS

| AU | 2016204098 A1 | 7/2016 |
| CN | 108292204 A | 7/2018 |

* cited by examiner

*Primary Examiner* — Hung D Le
(74) *Attorney, Agent, or Firm* — FINNEGAN, HENDERSON, FARABOW, GARRETT & DUNNER, LLP

(57) ABSTRACT

In computing, an unresolved problem of high manual effort required for mapping data attributes between the source and the target systems involved in process of the data transformation. This disclosure relates to method of auto-mapping of a plurality of source data attributes and a plurality of target data attributes associated with one or more applications based on similarity of a metadata information is provided. The processor implemented method include processing, a corresponding source table to a target table based on similarity associated with a table name; determining, a candidate source data attributes for at least one target data attribute based on similarity associated with a data attribute name; computing, a weighted score of each of the candidate source data attributes for corresponding at least one target data attribute; and mapping, the weighted score to determine an association of a final data attribute.

13 Claims, 6 Drawing Sheets

SYSTEM AND METHOD FOR AUTO-MAPPING SOURCE AND TARGET DATA ATTRIBUTES BASED ON METADATA INFORMATION

PRIORITY CLAIM

This U.S. patent application claims priority under 35 U.S.C. § 119 to: India Application No. 202021044626, filed on Oct. 13, 2020. The entire contents of the aforementioned application are incorporated herein by reference.

TECHNICAL FIELD

This disclosure relates generally to a data transformation, and, more particularly, to system and method for auto-mapping source and target data attributes associated with one or more applications based on similarity of metadata information.

BACKGROUND

In computing, data transformation is a process of converting data from one format or structure into another format or structure. In a typical scenario, where the information needs to be shared, extracted from a source application, transformed into another format, and then loaded into a target application or a data warehouse. Depending on nature of integration scenario, data or information are transformed i.e., processed, converted, merged, aggregated, enriched, or filtered. The data transformation is divided one or more steps, i.e., data discovery, data mapping and transformation, code generation, code execution, and data review and each applicable as needed based on complexity of the data transformation required. The data mapping is a process of specifying how target data store are populated from data in one or more source data stores.

An individual data analyst traditionally performs the data mapping as he/she understand business domain as well as meaning of one or more data attributes. In present scenario, an analysis is normally a manual activity since each target data attribute needs to be mapped to a source of associated data. Majority of the data attributes have one to one mapping along with some transformation required. However, typical number of tables in a simple to medium data transformation project include 250 tables approximately. Considering, forty attributes in each table, then the mapping activity becomes a significant one (i.e., mapping of 10000 attributes) if done manually. Further, the current process adapted by most of tools or products in market is the manual mapping performed by the individual data analyst. A substantial effort is needed while performing the manual mapping or linking of the data attributes between the source and the target systems in the data transformation.

SUMMARY

Embodiments of the present disclosure present technological improvements as solutions to one or more of the above-mentioned technical problems recognized by the inventors in conventional systems. For example, in one aspect, a processor implemented method of auto-mapping of a plurality of source data attributes and a plurality of target data attributes based on similarity of a metadata information is provided. The processor implemented method includes at least one of: processing, via one or more hardware processors, a corresponding source table to a target table based on similarity associated with a table name; determining, via the one or more hardware processors, a candidate source data attributes for at least one target data attribute based on similarity associated with a data attribute name; computing, via the one or more hardware processors, a weighted score of each of the candidate source data attributes for corresponding at least one target data attribute; and mapping, via the one or more hardware processors, the weighted score to determine an association of a final data attribute. In an embodiment, a plurality of data attributes (TA1-TAx) associated with the at least one target table is read. In an embodiment, a plurality of data attributes (SA1-SAy) associated with a mapped or a set of source table is read.

In an embodiment, the at least one data attributes may correspond to at least one of: (i) a data attribute name, (ii) data type, (iii) length, (iv) constraints, and (v) key information. In an embodiment, the one or more hardware processors may be further configured to compute a percentage of similarity between the target table (TNx) and source table name (SN1 to SNy) based on a fuzzy string matching. In an embodiment, the one or more hardware processors may be further configured to compute a percentage of similarity between the target data attribute and the source data attribute (ScoreTAxSA1) based on at least one of (a) a Hybrid Tokenization, or (b) a fuzzy string matching, or (c) combination thereof. In an embodiment, the one or more hardware processors may be further configured to compare a plurality of tokens across at least one of data attribute names. In an embodiment, the plurality of tokens matches results in data attribute matching through derivation of weighted score based on number of tokens matched. In an embodiment, the data attribute names may split in the plurality of tokens based on a plurality of separators. In an embodiment, the plurality of separators corresponds to at least one of (a) underscore (_), (b) hyphen (-). In an embodiment, the one or more hardware processors may be further configured to: (a) read, the table name for each of the target table (TNx); (b) read, the at least one source table name (SN1 to SNy); and (c) compare, the target table name (TNx) with each of the source table names. In an embodiment, if one source data attribute with the weighted score greater than or equal to a threshold weighted score then the corresponding source data attribute may be set as a mapped data attribute for the target data attribute. In an embodiment, multiple source data attributes with the highest weighted score may corresponds to alternate data attributes. In an embodiment, the one or more hardware processors may be further configured to determine at least on of (a) a plurality of selected mapped source and target data attributes, and (b) a plurality of rejected mapped source and target data attributes based on a linear regression. In an embodiment, the plurality of selected mapped data attributes may correspond to a RMSelCount and the plurality of rejected mapped data attributes may correspond to a RMRejCount. In an embodiment, a percentage of measure of usefulness (MOU) for corresponding plurality of applications may be determined based on the RMSelCount and the RMRejCount.

In another aspect, there is provided a system to auto-map a plurality of source data attributes and a plurality of target data attributes based on similarity of a metadata information. The system comprises a memory storing instructions; one or more communication interfaces; and one or more hardware processors coupled to the memory via the one or more communication interfaces. The one or more hardware processors are configured by the instructions to: process, a corresponding source table to a target table based on similarity associated with a table name; determine, a candidate source data attributes for at least one target data attribute based on similarity associated with a data attribute name; compute, a weighted score of each of the candidate source data attributes for corresponding at least one target data attribute; and map, the weighted score to determine an association of a final data attribute. In an embodiment, a plurality of data attributes (TA1-TAx) associated with the at least one target table is read. In an embodiment, a plurality of data attributes (SA1-SAy) associated with a mapped or a set of source table is read.

In an embodiment, the at least one data attributes may correspond to at least one of: (i) a data attribute name, (ii) data type, (iii) length, (iv) constraints, and (v) key information. In an embodiment, the one or more hardware processors may be further configured to compute a percentage of similarity between the target table (TNx) and source table name (SN1 to SNy) based on a fuzzy string matching. In an embodiment, the one or more hardware processors may be further configured to compute a percentage of similarity between the target data attribute and the source data attribute (ScoreTAxSA1) based on at least one of (a) a Hybrid Tokenization, or (b) a fuzzy string matching, or (c) combination thereof. In an embodiment, the one or more hardware processors may be further configured to compare a plurality of tokens across at least one of data attribute names. In an embodiment, the plurality of tokens matches results in data attribute matching through derivation of weighted score based on number of tokens matched. In an embodiment, the data attribute names may split in the plurality of tokens based on a plurality of separators. In an embodiment, the plurality of separators corresponds to at least one of (a) underscore (_), (b) hyphen (-). In an embodiment, the one or more hardware processors may be further configured to: (a) read, the table name for each of the target table (TNx); (b) read, the at least one source table name (SN1 to SNy); and (c) compare, the target table name (TNx) with each of the source table names. In an embodiment, if one source data attribute with the weighted score greater than or equal to a threshold weighted score then the corresponding source data attribute may be set as a mapped data attribute for the target data attribute. In an embodiment, multiple source data attributes with the highest weighted score may corresponds to alternate data attributes. In an embodiment, the one or more hardware processors may be further configured to determine at least on of (a) a plurality of selected mapped source and target data attributes, and (b) a plurality of rejected mapped source and target data attributes based on a linear regression. In an embodiment, the plurality of selected mapped data attributes may correspond to a RMSelCount and the plurality of rejected mapped data attributes may correspond to a RMRejCount. In an embodiment, a percentage of measure of usefulness (MOU) for corresponding plurality of applications may be determined based on the RMSelCount and the RMRejCount.

In yet another aspect, there are provided one or more non-transitory machine-readable information storage mediums comprising one or more instructions which when executed by one or more hardware processors causes at least one of: processing, a corresponding source table to a target table based on similarity associated with a table name; determining, a candidate source data attributes for at least one target data attribute based on similarity associated with a data attribute name; computing, a weighted score of each of the candidate source data attributes for corresponding at least one target data attribute; and mapping, the weighted score to determine an association of a final data attribute. In an embodiment, a plurality of data attributes (TA1-TAx) associated with the at least one target table is read. In an embodiment, a plurality of data attributes (SA1-SAy) associated with a mapped or a set of source table is read.

In an embodiment, the at least one data attributes may correspond to at least one of: (i) a data attribute name, (ii) data type, (iii) length, (iv) constraints, and (v) key information. In an embodiment, the one or more instructions which when executed by one or more hardware processors causes computing a percentage of similarity between the target table (TNx) and source table name (SN1 to SNy) based on a fuzzy string matching. In an embodiment, the one or more instructions which when executed by one or more hardware processors causes computing a percentage of similarity between the target data attribute and the source data attribute (ScoreTAxSA1) based on at least one of (a) a Hybrid Tokenization, or (b) a fuzzy string matching, or (c) combination thereof. In an embodiment, the one or more hardware processors may be further configured to compare a plurality of tokens across at least one of data attribute names. In an embodiment, the plurality of tokens matches results in data attribute matching through derivation of weighted score based on number of tokens matched. In an embodiment, the data attribute names may split in the plurality of tokens based on a plurality of separators. In an embodiment, the plurality of separators corresponds to at least one of (a) underscore (_), (b) hyphen (-). In an embodiment, the one or more instructions which when executed by one or more hardware processors causes: (a) reading, the table name for each of the target table (TNx); (b) reading, the at least one source table name (SN1 to SNy); and (c) comparing, the target table name (TNx) with each of the source table names. In an embodiment, if one source data attribute with the weighted score greater than or equal to a threshold weighted score then the corresponding source data attribute may be set as a mapped data attribute for the target data attribute. In an embodiment, multiple source data attributes with the highest weighted score may corresponds to alternate data attributes. In an embodiment, the one or more hardware processors may be further configured to determine at least on of (a) a plurality of selected mapped source and target data attributes, and (b) a plurality of rejected mapped source and target data attributes based on a linear regression. In an embodiment, the plurality of selected mapped data attributes may correspond to a RMSelCount and the plurality of rejected mapped data attributes may correspond to a RMRejCount. In an embodiment, a percentage of measure of usefulness (MOU) for corresponding plurality of applications may be determined based on the RMSelCount and the RMRejCount.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
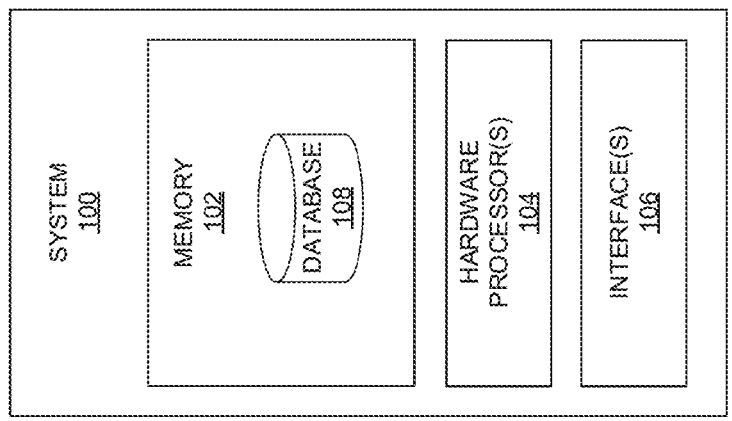
FIG. 1 illustrates a system for auto-mapping of a plurality of source data attributes and a plurality of target data attributes based on similarity of a metadata information, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments of the present disclosure provide a system and method for auto mapping of a plurality of source data attributes and a plurality of target data attributes based on similarity of metadata information by one or more techniques like phonetics, pattern matching and fuzzy string matching. The embodiments of the present disclosure find a similarity in the metadata of the source and the target data attributes to establish an association based on one or more information of the data attributes (i.e., columns) such as data attribute name, data type, length, constraints, key information (i.e., primary/foreign key) based on fuzzy string matching using phonetics for table name, a Hybrid tokenization approach combined with Fuzzy Matching (HT-FM) for the data attribute name, pattern matching for data types, variance for length, simple comparison for constraints, derivation for key information. The embodiments of the present disclosure improve the system by capturing one or more user decisions and incorporating the associated learning in the tables and data attributes associated with multiple applications/databases or schemas. The measure of usefulness (MOU) of system provided output to a user can be in varying degree.

Referring now to the drawings, and more particularly to FIGS. 1 through 4B, where similar reference characters denote corresponding features consistently throughout the figures, there are shown preferred embodiments and these embodiments are described in the context of the following exemplary system and/or method.

FIG. 1 illustrates a system 100 for auto-mapping of the plurality of source data attributes and the plurality of target data attributes based on similarity of the metadata information, according to some embodiments of the present disclosure. In an embodiment, the system 100 includes one or more hardware processor(s) 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology. The repository, amongst other things, includes a system database and other data. The other data may include data generated as a result of the execution of one or more modules in the plurality of modules. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
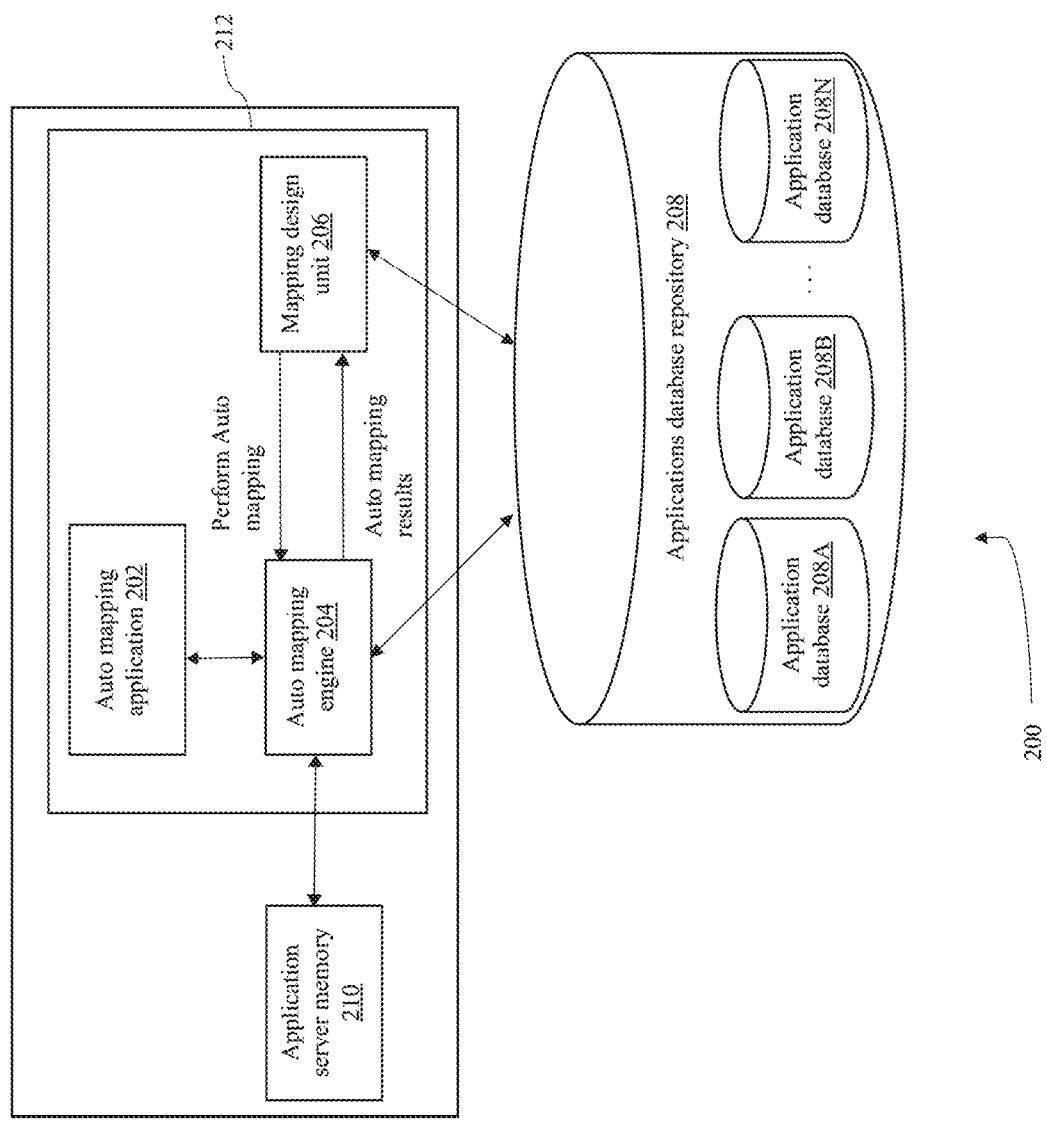
FIG. 2 illustrates an exemplary system for auto-mapping of the plurality of source data attributes and the plurality of target data attributes based on similarity of the metadata information, according to some embodiments of the present disclosure.

FIG. 2 illustrates an exemplary data transformation system 200 for auto-mapping of the plurality of source data attributes and the plurality of target data attributes based on similarity of the metadata information, according to some embodiments of the present disclosure. The data transformation system 200 include a data transformation application 212. The data transformation application 212 include an auto mapping application 202, an auto mapping engine 204, and a mapping design unit 206. In an embodiment, the data transformation system 200 include a data transformation server which include an application server memory 210, the data transformation application 212 which interacts with an applications database repository 208. The applications database repository 208 include a plurality of application databases 208A-N. The data transformation application 212 which interacts with the applications database repository 208 with the one or more application databases 208A-N to receive information related to the plurality of source data attributes and the plurality of target data attributes associated with the one or more applications. The data transformation application 212 is configured to auto mapping of the plurality of source data attributes and the plurality of target data attributes based on similarity of the metadata information. In an embodiment, the auto-mapping process is performed by one or more techniques like phonetics, a pattern matching, and a fuzzy string matching. The data transformation application 212 enables one or more users to find similarities in the source data attributes and the target data attributes associated with one or more applications, thereby automatically map/associate which can be reviewed by the one or more users for editing. In an embodiment, the data attributes are at least one of (a) a data attribute name, a data type, a length, one or more constraints, and a key information (e.g., primary/foreign key).

In an embodiment, the similarity in the metadata of the source and the target data attributes to establish an association based on one or more information of the data attributes (i.e., columns) such as data attribute name, data type, length, constraints, key information (i.e., primary/foreign key) based on fuzzy string matching using phonetics for table name, a Hybrid tokenization approach combined with Fuzzy Matching (HT-FM) for the data attribute name, pattern matching for data types, variance for length, simple comparison for constraints, derivation for key information.

The data transformation system 200 can implement one or more steps: (a) determine and associate a corresponding source table to a target table associated with one or more applications based on a table name similarity, (b) determine a candidate source data attributes for every target data attribute based on a data attribute name similarity, and (c) determine a weighted score of each of the candidate source data attributes associated with one or more applications and determine a final data attribute association/mapping based on the weighted score.

The data transformation application 212 which process the corresponding source table to the target table associated with one or more applications based on similarity associated with the table name. The table name for each of the target table (i.e., TNx) is read. In an embodiment, the at least one source table name associated with one or more applications is read as SN1 to SNy. The target table name (i.e., TNx) associated with one or more applications is compared with each of the source table names. In an embodiment, the target table name (i.e., TNx) is compared by a fuzzy string-matching algorithm.

The target table name (i.e., TNx) is compared with each of the source table names which include one or more steps:
  a. a percentage similarity is calculated between the target table name (TNx) and the source table name corresponds to ScoreTNxSNy.
     i. If this score is >ScoreSTTrshld (Threshold score is configurable, default as 75%) then consider as a strong match.
     ii. Else if the score is >=ScoreSTMin (minimum score is configurable, default as 60%) then consider as a probable match.
     iii. Else discard the Score as it is <ScoreSTMin.
  b. Run all source table names to calculate a similarity score of the scoreTNxSNy with all source table names SN1 to SNy and process the score for each source table name.
  c. Once all source tables are processed, an at least one strong match and an at least one probable match are checked.
  d. If there are source tables qualified for the strong match, then select the source table with a highest score.
  e. If there is only one source table with the highest score among the strong matches, then set the source table as a mapped table for the target table.
     i. Store the top "N" Strong matches (except the mapped table) as "Alternate Table Mappings".
     ii. "N" is a configurable parameter for count of strong matches to consider for the user and consider default value is 3.
     iii. If there are multiple strong matches with exactly same scores, then store all and if considering anyone results can be more than 3. For example,
        1. If score are 79%, 77%, 76.5%, 77%, 77%, then consider 79%, 77%, 77%, 77% i.e. 4 results.
        2. If scores are 79%, 77%, 76.5%, 76.5%, 76.5%, 76% then consider 79%, 77%, 76.5%, 76.5%, 76.5% i.e., 5 results.
     iv. If there are <"N" strong matches except the mapped table then consider probable matches to have N "Alternate Table Mappings" by using same logic for selection in case of same scores of data attributes.
  f. If there are multiple source tables with the highest score among the strong matches, then consider all the source tables with highest score as "Alternate Table Mappings". There is no defined count for all strong matches with highest score are considered for the user and i.e., no source table is set as the mapped table for the target table.
  g. If there are there are zero source tables qualified for strong match, then select the top "M" probable match with highest score as "Alternate Table Mappings". "M" is a configurable parameter for count of Probable matches to consider for the user with default value is 5.
  h. The same logic is applied for number of results to display in case there are source tables with same score i.e., if a table falls in top five bracket and is getting selected for display to user and there are other tables with same score then all tables are displayed and i.e., no source table is set as the mapped table for the target table.

The data transformation application 212 which process mapping of a target to source data attribute associated with one or more applications. In an embodiment, all corresponding data attributes i.e., TA1-TAx is read for every target table. In an embodiment, all corresponding data attributes i.e., SA1-SAy for the corresponding a mapped/a set source table. The one or more target data attributes:
  i. considering the first source data attribute.
  j. a percentage similarity between the target data attribute and the source data attribute i.e., ScoreTAxSAi is calculated by the Hybrid Tokenization and the fuzzy string-matching algorithm.
     i. If the score is >ScoreSATrshld (Threshold score is configurable, default as 75%), then consider as a strong match.
     ii. Else if the score is >=ScoreSAMin (minimum score is configurable, default as 60%) then consider as probable match.
     iii. Else discard the Score as <ScoreSAMin.
  k. Run all source data attribute names to calculate a similarity score of ScoreTAxSAy with all source data attribute names SA1 to SAy and process the score as per above steps for each source data attribute name.
  l. Once all the source data attributes are processed, check is performed for determining the strong matches and probable matches.
  m. If there are no strong or probable matches (i.e., no candidate mappings). Considering, no association derived for the target data attribute and continue the process for other target data attributes.

n. If there are any matches then considering top "Z" Matches (default value of Z are five and configurable) or available matches (if <"Z") out of them based on the match score.

The data transformation application 212 which process mapping of the target data attribute associated with one or more applications based on weighted scoring for one or more candidate matches. For example, considering one or more candidate source data attribute matches (Top "Z" strong/probable matches) for every target data attributes.

In an embodiment, the weighted score derived for matrix of sub calculations on below mentioned in Table 1:

TABLE 1

| Rule Type | Applied on | Rule Score Calculation | Weight/ Importance | Weighted Rule Score |
|---|---|---|---|---|
| Hybrid tokenization and Fuzzy String-Matching using Phonetics | Data Attribute Name | % Similarity score from 0-100% | 25% (configurable) | WRS1 = Weight * RS |
| Pattern Matching | Attribute Data Type | 0 or 100 (100 if same Data Type) | 25% (configurable) | WRS2 = Weight * RS |
| Length Similarity (based on Variance) | Attribute Length | 0 to 100 (100 for same length, 70 for lengths 7 and 10) | 20% (configurable) | WRS3 = Weight * RS |
| Simple Comparison | Attribute Constraints | 0 to 100 (100 for all constraints being exactly same. 60% if 3 of 5 constraints same) | 15% (configurable) | WRS4 = Weight * RS |
| Key Association | Key Information | 0 or 100 (100 if both are PK or both are FK or both are Unique Keys) | 15% (configurable) | WRS5 = Weight * RS |
| | | | Weighted Score | Sum (WRS1 to WRS5) |
| | | | Weighted Score Threshold= | 60% |

Considering the weighted scores for each of the candidate source data attributes and select the one with highest score:

a. If there is only one source data attribute with weighted score>=Threshold weighted score, then set the corresponding source data attribute as the mapped attribute for the target data attribute. Then, top three data attributes are set based on weighted score (except the mapped data attribute) as the "Alternate Attribute Mappings"

b. If there are multiple Source data attributes with weighted score>=threshold weighted score and there is only one source data attribute with the highest weighted score among all source data attributes then set the corresponding source data attribute as the mapped data attribute for the target data attribute. Then, top three data attributes are set based on weighted score (except the mapped attribute) as the "Alternate data Attribute Mappings"

c. If there are multiple source data attributes with the highest weighted score, then consider all of them as "Alternate data Attribute Mappings".

d. All source attributes with highest score are considered for the user and no source attribute is set as the mapped data attribute for the target data attribute.

e. If there are no source data attribute with weighted score>=Threshold weighted score, then no source data attribute is set as the mapped data attribute for the target data attribute.

The Fuzzy matching algorithm include one or more steps (a) compares input strings (i.e., single or multiple words) by parsing them sequentially, (b) identifies and analyses the phonetic patterns and distinguishes vowels and consonants, (c) interprets the differences between the input words based on the sound/pronunciations by applying phonetic based comparison, and (d) the resultant output of the algorithm is a match score in percentage between 1 to 100 where 100 percentage signifies an exact match and as the percentage score lowers, the degree of similarity between the words goes down.

In an embodiment, for data attribute name matching, a Hybrid tokenization is applied before applying the Fuzzy Matching algorithm which use a string, a word and phonetic tokens for processing the data attribute names. The one or more steps involved are: (a) The data attribute names are split in multiple tokens based on separators such as underscore (_), hyphen (-) and so on; (b) The multiple word tokens are individually maintained in memory; (c) The multiple word tokens are then standardized for uniformity i.e. cust→Customer, Nm→Name, Addr→Address; (d) The multiple word tokens are then enriched for abbreviation handling e.g., PAN—Permanent Account Number, GST—Goods Services Tax etc., wherein each abbreviated letter translates to separate token e.g. PAN converts to three tokens—Permanent, Account, Number; (e) The tokens are then individually compared across the data attribute names in permutation and combinations; (f) The Token matches then result in an data attribute matching through derivation of a score based on number of tokens matched; and (g) If the Tokens result in an accurate match then the fuzzy logic matching step is skipped else proceeded to fuzzy matching as per above to find data attribute name similarity.

In an embodiment, the user can view one or more system identified mappings on the mapping design unit 206 of the data transformation application 212.

In an embodiment, a "Decision Tree" Algorithm implementing the Machine learning aspects and "Linear Regression" as the secondary algorithm. In an embodiment, data patterns and the matching vs non-matching decisions being made based on threshold values, weighted scores across different data attribute properties which represent the logical conditions.

The user can view one or more source attributes to target data attribute matches found and recommended by the system, referred as "RMCount" for the selected table. The RMcount includes a plurality of selected mapped data attributes (a RMSelCount), and a plurality of rejected mapped data attributes (a RMRejCount). In an embodiment, the plurality of selected mapped source and target data attributes, and (b) the plurality of rejected mapped source and target data attributes based on a linear regression In an embodiment, the user either accept the system recommended mapping or discard them and select a different one. In an embodiment, the solution records a count of all such accepted and rejected mappings cumulatively as "RMSelCount" and "RMRejCount". For each rejected mapping system records the selection performed by the user and calculate similarity or matching percentage between the target data attribute and the user selected source data attribute. In an embodiment, information is collected for all tables within different schemas, databases, applications collectively or separately at each level based on a solution configuration which can be set by the user. In an embodiment, a percentage of measure of usefulness (MOU) for corresponding plurality of applications is determined based on the RMSelCount and the RMRejCount.

MOU %=(RMSelCOunt/RMCount)*100 for given plurality of schemas, databases, and/or applications or at a deployment level.

1. The machine learning can be applied to the following properties to improve the MOU:
    i. Correction/adjustment/tuning of threshold score for matching i.e. ScoreSATrshld;
    ii. Correction/adjustment/tuning of weightage of different rules/properties of a data attribute considered for matching.
2. If MOU is >=75% then having a very optimal scenario and the solution objective is already achieved.
3. If MOU is <75% analyze the four values for each of the rejected mapping TARejx:
    a. Matching score for system recommended mapping as ScoreTAxSAy.
    b. Matching score for the user selected (overridden) source data attribute as OvrdTScore-x.
    c. Threshold score for matching—ScoreSATrshld
    d. Minimum Matching score for the target data attribute as ScoreSAMin.
4. If MOU is <75% and >60% then analyse the User Override matches as:
    a. If OvrdTScore-x<ScoreSAMin for more than or equal to 80% of the rejected/override cases
        i. Then decrease the value of ScoreSAMin by 20% of (ScoreSAMin-OvrdTScore-x) to accommodate user selected data attributes in probable matches. Retain old values as historical settings.
        ii. Else omit OvrdTScore-x as an outlier or exception scenario where data attribute names are very cryptic and do not match at all and hence solution may not be able to detect a similarity.
    b. If OvrdTScore>ScoreSATrshld and OvrdTScore>ScoreTAxSAy and the scenario is not possible as system recommends the data attribute having highest score.
    c. If OvrdTScore>ScoreSATrshld and OvrdTScore<ScoreTAxSAy for more than or equal to 80% of the rejected/override cases, then
        i. Check individual rule score.
        ii. Increase the weightage for the rules by 20% where Override Source data attribute include higher value of rule score than the system recommended data attribute and decrease the weightage for the rules by 20%. Retain old values as historical settings.
    d. If OvrdTScore-x>ScoreSAMin and OvrdTScore<ScoreSATrshld for more than or equal to 80% of the rejected/override cases then decrease the value of ScoreSATrshld by 20% of (ScoreSATrshld-OvrdTScore-x). Retain old values as historical settings.
5. If MOU is <60% and >40% then analyze the user override matches as per previous step with the 20% value of increase/decrease changing to 40%. Retain old values as historical settings.
6. If MOU is <40% then generate an alert that the solution is not useful for the end user and needs to be relooked at completely.
7. If MOU increases due to adjustment of threshold matching % and rule weightages through machine learning, then revert back to original % used earlier.

The auto-mapping utilizes the updated threshold matching percentage and the rule weightages to display better and more optimal results for the user.

Figure 3A:
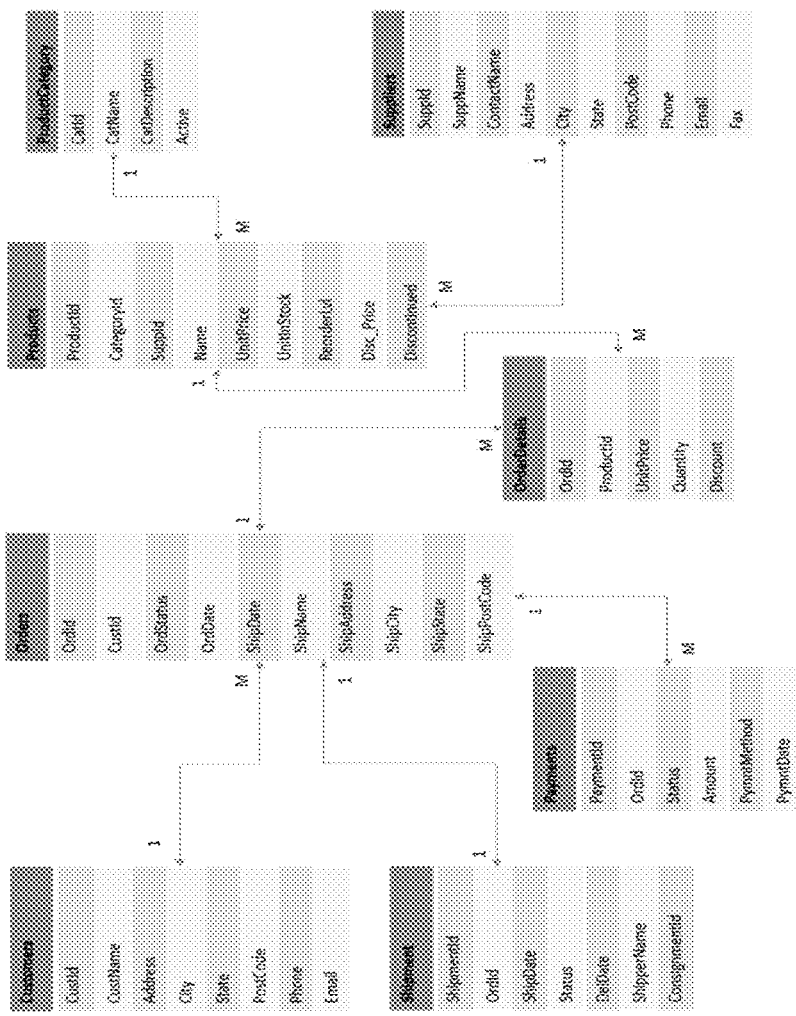
FIG. 3A and FIG. 3B illustrates an exemplary flow diagrams depicting how data being migrated from a source schema to a target schema, according to some embodiments of the present disclosure.
Figure 3B:
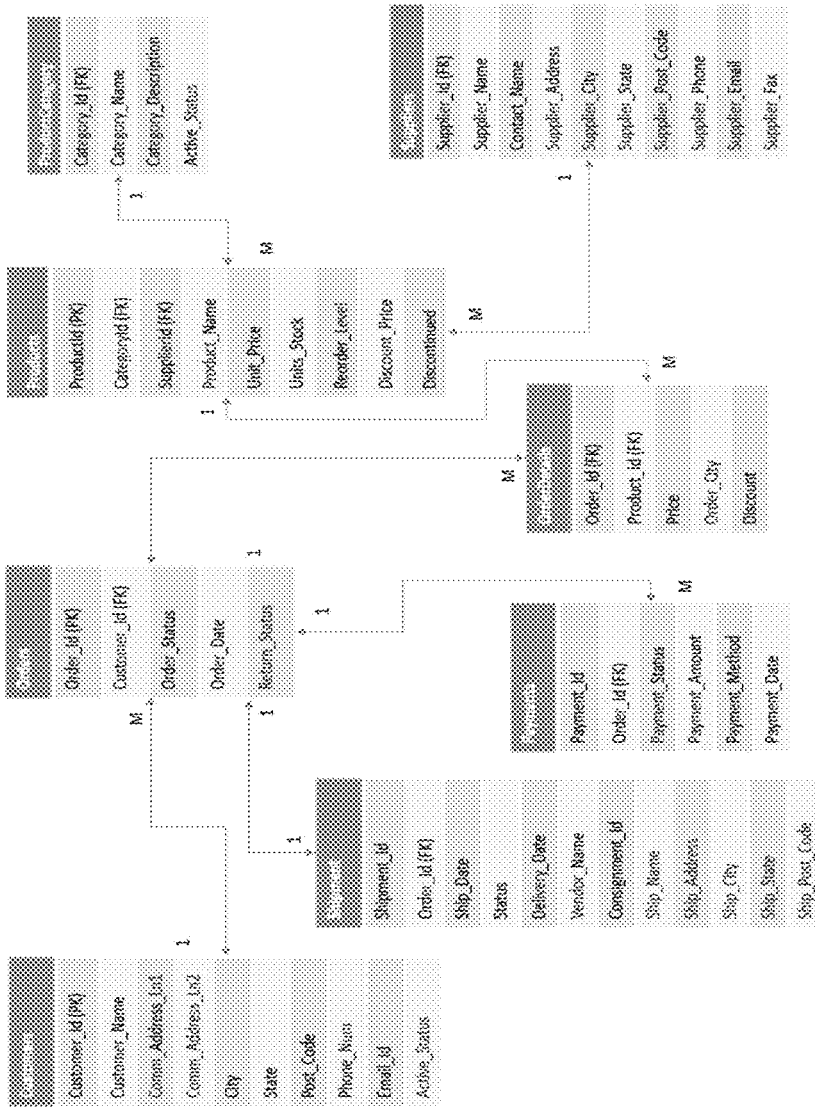

FIG. 3A and FIG. 3B illustrates an exemplary flow diagrams depicting how data being migrated from a source data schema to a target data schema, according to some embodiments of the present disclosure. For example, one or more differences between the source and the target data schemas are highlighted. For example, the system depicted with eight tables, whereas real life applications/systems may include greater than 100 tables. The user can review and acknowledge the system provided mapping or select one of the alternate mappings. For example, a first scenario, the user can see the attribute level mappings for all data attributes of the selected target table. For example, a second and third scenario, the system performs calculations once the user selects the source table mapping from the available alternate mappings and display the data attribute level mappings for all data attributes of the selected target table. The user can review the source data attribute mappings for every target data attribute and similarly select the best mapping. There are one or more exemplary scenarios for the data attribute mapping: (a) Mapped source data attribute and alternate data attribute mappings, if there are qualifying source data attributes (i.e. score beyond weighted threshold score) and a single data attribute with highest matching score, (b) Alternate mappings, if there are multiple source data attributes with same score and no single data attribute can be identified by the system, and (c) No mappings, if there are no source data attributes with score beyond the minimum value. In an embodiment, the Fuzzy string-matching algorithm using phonetics a K-diff algorithm which compares any two strings and gives their percentage similarity. In an embodiment, the user is allowed another option of using a Jaro-Winkler string comparison algorithm.

Figure 4A:
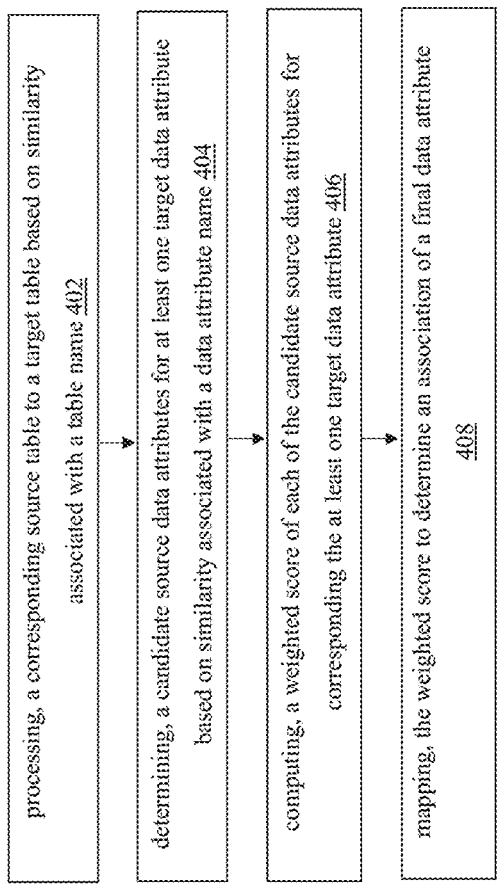
FIG. 4A and FIG. 4B are an exemplary flow diagrams illustrating a method for auto-mapping of the plurality of source data attributes and the plurality of target data attributes based on similarity of the metadata information, according to some embodiments of the present disclosure.
Figure 4B:
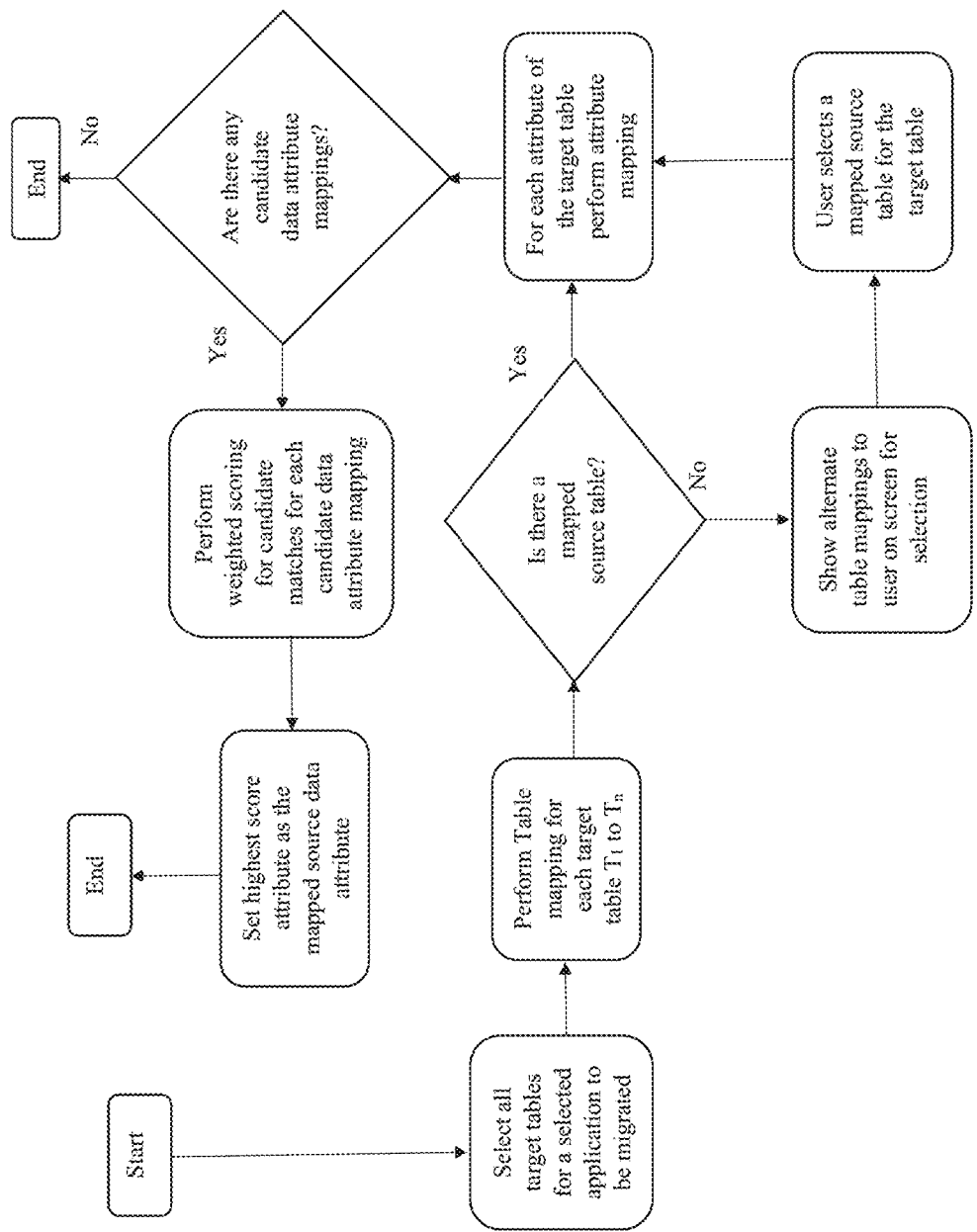

FIG. 4A and FIG. 4B are an exemplary flow diagrams illustrating a method for auto-mapping of the plurality of source data attributes and the plurality of target data attributes based on similarity of the metadata information, according to some embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system as depicted in FIGS. 1 and 2.

At step 402, a corresponding source table to a target table is processed based on similarity associated with a table name. At step 404, candidate source data attributes are determined for at least one target data attribute based on similarity associated with a data attribute name. In an embodiment, a plurality of data attributes (TA1-TAx) associated with the at least one target table is read. In an embodiment, a plurality of data attributes (SA1-SAy) associated with a mapped or a set of source table is read. At step 406, a weighted score of each of the candidate source data attributes is computed for corresponding at least one target data attribute. At step 408, the weighted score is mapped to determine an association of a final data attribute.

In an embodiment, the at least one data attributes may correspond to at least one of: (i) a data attribute name, (ii) data type, (iii) length, (iv) constraints, and (v) key information. In an embodiment, the one or more hardware processors may be further configured to compute a percentage of similarity between the target table (TNx) and source table name (SN1 to SNy) based on a fuzzy string matching. In an embodiment, the one or more hardware processors may be further configured to compute a percentage of similarity between the target data attribute and the source data attribute (ScoreTAxSA1) based on at least one of (a) a Hybrid Tokenization, or (b) a fuzzy string matching, or (c) combination thereof. In an embodiment, the one or more hardware processors may be further configured to compare a plurality of tokens across at least one of data attribute names. In an embodiment, the plurality of tokens matches results in data attribute matching through derivation of weighted score based on number of tokens matched. In an embodiment, the data attribute names may split in the plurality of tokens based on a plurality of separators. In an embodiment, the plurality of separators corresponds to at least one of (a) underscore (_), (b) hyphen (-). In an embodiment, the one or more hardware processors may be further configured to: (a) read, the table name for each of the target table (TNx); (b) read, the at least one source table name (SN1 to SNy); and (c) compare, the target table name (TNx) with each of the source table names.

In an embodiment, if one source data attribute with the weighted score greater than or equal to a threshold weighted score then the corresponding source data attribute may be set as a mapped data attribute for the target data attribute. In an embodiment, multiple source data attributes with the highest weighted score may corresponds to alternate data attributes. In an embodiment, the one or more hardware processors may be further configured to determine at least on of (a) a plurality of selected mapped source and target data attributes, and (b) a plurality of rejected mapped source and target data attributes based on a linear regression. In an embodiment, the plurality of selected mapped data attributes may correspond to a RMSelCount and the plurality of rejected mapped data attributes may correspond to a RMRejCount. In an embodiment, a percentage of measure of usefulness (MOU) for corresponding plurality of applications may be determined based on the RMSelCount and the RMRejCount.

The embodiments of present disclosure herein address unresolved problem of a high manual effort required for mapping or linking of one or more data attributes between the source and the target systems involved in process of the data transformation. The embodiments of the present disclosure provide a significant technical improvement by performing mapping process amongst source tables, target tables and data attributes information associated with the one or more applications received from one or more application databases. The embodiments of present disclosure thus provide the data transformation system to find similarity in the metadata of the source and target data attributes based on use of phonetics, pattern matching and fuzzy string matching. The embodiments of present disclosure attempt to reduce the high manual effort required for mapping of data attributes between the source and the target systems involved in the process of the data transformation. The user can review the MOU % trend across time and see if the machine learning algorithm is effective else report an issue leading to the relook of the machine learning algorithm.

The embodiments of present disclosure herein provide the user presented with a multilevel hierarchical recommendation based on the complete auto linking process. The user can see multiple matches for each of the Target table and the Target data attribute with the highest scoring match at the top of the hierarchy followed by other matches with decreasing score/degree of similarity. Enables the user to have multiple choices especially when the resultant matches are very similar and the differences between the matching scores is less and user needs to see hierarchical view of results.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for auto-mapping of a plurality of source data attributes and a plurality of target data attributes based on similarity of a metadata information, comprising:

processing, via one or more hardware processors, a corresponding source table to a target table based on similarity associated with a table name;

determining, via the one or more hardware processors, a candidate source data attributes for at least one target data attribute based on similarity associated with a data attribute name, wherein a plurality of data attributes (TA1-TAx) associated with the at least one target table is read, wherein a plurality of data attributes (SA1-SAy) associated with a mapped or a set of source table is read;

computing, via the one or more hardware processors, a weighted score of each of the candidate source data attributes for corresponding at least one target data attribute;

computing, via the one or more hardware processors, a percentage of similarity between the target table (TNx) and source table name (SN1 to SNy) based on a fuzzy string matching; and computing, via the one or more hardware processors, a percentage of similarity between the target data attribute and the source data attribute (ScoreTAxSA1) based on at least one of (a) a Hybrid tokenization, or (b) a fuzzy string matching, or (c) combination thereof; and mapping, via the one or more hardware processors, the weighted score to determine an association of a final data attribute.

2. The processor implemented method as claimed in claim 1, wherein the at least one data attributes correspond to at least one of: (i) a data attribute name, (ii) data type, (iii) length, (iv) constraints, and (v) key information.

3. The processor implemented method as claimed in claim 1, further comprising, comparing, via the one or more hardware processors, a plurality of tokens across at least one data attribute names, wherein the plurality of tokens matches results in the data attribute matching through derivation of weighted score based on number of tokens matched, and wherein the at least one data attribute names are split into the plurality of tokens based on a plurality of separators, wherein the plurality of separators corresponds to at least one of (a) underscore (_), (b) hyphen (-).

4. The processor implemented method as claimed in claim 1, further comprising at least one of: (a) reading, via the one or more hardware processors, the table name for each of the target table (TNx); (b) reading, via the one or more hardware processors, the at least one source table name (SN1 to SNy); and (c) comparing, via the one or more hardware processors, the target table name (TNx) with each of the source table names.

5. The processor implemented method as claimed in claim 1, wherein if one source data attribute with the weighted score greater than or equal to a threshold weighted score then the corresponding source data attribute is set as a mapped data attribute for the target data attribute, and wherein multiple source data attributes with the highest weighted score corresponds to alternate data attributes.

6. The processor implemented method as claimed in claim 1, further comprising, determining, via the one or more hardware processors, at least one of (a) a plurality of selected mapped source and target data attributes, and (b) a plurality of rejected mapped source and target data attributes based on a linear regression, and wherein the plurality of selected mapped data attributes corresponds to a RMSelCount and the plurality of rejected mapped data attributes corresponds to a RMRej Count, wherein a percentage of measure of usefulness (MOU) for corresponding plurality of applications is determined based on the RMSelCount and the RMRej Count.

7. A system (100) to auto-map a plurality of source data attributes and a plurality of target data attributes based on similarity of a metadata information, comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:
- process, a corresponding source table to a target table based on similarity associated with a table name;
- determine, a candidate source data attributes for at least one target data attribute based on similarity associated with a data attribute name, wherein a plurality of data attributes (TA1-TAx) associated with the at least one target table is read, wherein a plurality of data attributes (SA1-SAy) associated with a mapped or a set of source table is read;
- compute, a weighted score of each of the candidate source data attributes for corresponding at least one target data attribute;
- compute a percentage of similarity between the target table (TNx) and source table name (SN1 to SNy) based on a fuzzy string matching; and
- compute a percentage of similarity between the target data attribute and the source data attribute (ScoreTAxSA1) based on at least one of (a) a Hybrid tokenization, or (b) a fuzzy string matching, or (c) combination thereof; and
- map, the weighted score to determine an association of a final data attribute.

8. The system (100) as claimed in claim 7, wherein the at least one data attributes correspond to at least one of: (i) a data attribute name, (ii) data type, (iii) length, (iv) constraints, and (v) key information.

9. The system (100) as claimed in claim 7, wherein the one or more hardware processors is further configured to compare a plurality of tokens across at least one data attribute names, wherein the plurality of tokens matches results in the data attribute matching through derivation of weighted score based on number of tokens matched, and wherein the at least one data attribute names are split into the plurality of tokens based on a plurality of separators, wherein the plurality of separators corresponds to at least one of (a) underscore (_), (b) hyphen (-).

10. The system (100) as claimed in claim 7, wherein the one or more hardware processors is further configured to: (a) read, the table name for each of the target table (TNx); (b) read, the at least one source table name (SN1 to SNy); and (c) compare, the target table name (TNx) with each of the source table names.

11. The system (100) as claimed in claim 7, wherein if one source data attribute with the weighted score greater than or equal to a threshold weighted score then the corresponding source data attribute is set as a mapped data attribute for the target data attribute, wherein multiple source data attributes with the highest weighted score are considered as alternate data attributes.

12. The system (100) as claimed in claim 7, wherein the one or more hardware processors is further configured to determine at least one of (a) a plurality of selected mapped source and target data attributes, and (b) a plurality of rejected mapped source and target data attributes based on a linear regression, and wherein the plurality of selected mapped data attributes corresponds to a RMSelCount and the plurality of rejected mapped data attributes corresponds to a RMRej Count, wherein a percentage of measure of usefulness (MOU) for corresponding plurality of applications is determined based on the RMSelCount and the RMRej Count.

13. One or more non-transitory machine readable information storage mediums comprising one or more instructions which when executed by one or more hardware processors causes:
- processing, a corresponding source table to a target table based on similarity associated with a table name;
- determining, a candidate source data attributes for at least one target data attribute based on similarity associated with a data attribute name, wherein a plurality of data attributes (TA1-TAx) associated with the at least one target table is read, wherein a plurality of data attributes (SA1-SAy) associated with a mapped or a set of source table is read;
- computing, a weighted score of each of the candidate source data attributes for corresponding at least one target data attribute;
- computing, via the one or more hardware processors, a percentage of similarity between the target table (TNx) and source table name (SN1 to SNy) based on a fuzzy string matching; and
- computing, via the one or more hardware processors, a percentage of similarity between the target data attribute and the source data attribute (ScoreTAxSA1) based on at least one of (a) a Hybrid tokenization, or (b) a fuzzy string matching, or (c) combination thereof; and
- mapping, the weighted score to determine an association of a final data attribute.

* * * * *